United States Patent
Higham

(10) Patent No.: US 7,675,421 B2
(45) Date of Patent: *Mar. 9, 2010

(54) RFID CABINET

(75) Inventor: John Higham, Menlo Park, CA (US)

(73) Assignee: Omnicell, Inc., Mountain View, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/019,310

(22) Filed: Jan. 24, 2008

(65) Prior Publication Data

US 2008/0173713 A1 Jul. 24, 2008

Related U.S. Application Data

(63) Continuation of application No. 11/187,383, filed on Jul. 21, 2005, now Pat. No. 7,348,884.

(60) Provisional application No. 60/592,907, filed on Jul. 29, 2004.

(51) Int. Cl.
*G08B 13/14* (2006.01)

(52) U.S. Cl. .............. 340/572.1; 340/572.4; 340/572.8; 340/568.1; 340/5.92; 340/5.54; 340/5.73; 700/221; 700/229; 700/237

(58) Field of Classification Search .............. 340/572.1, 340/572.4, 572.8, 568.1, 5.92, 5.54, 5.73; 700/221, 229, 237

See application file for complete search history.

(56) References Cited

U.S. PATENT DOCUMENTS

| | | | |
|---|---|---|---|
| 4,227,037 A | 10/1980 | Layton | |
| 4,496,406 A | 1/1985 | Dedow | |
| 5,739,765 A | 4/1998 | Stanfield et al. | |
| 5,751,221 A | 5/1998 | Stanfield et al. | |
| 5,771,003 A | 6/1998 | Seymour | |
| 5,774,053 A * | 6/1998 | Porter | 340/568.1 |
| 5,774,059 A * | 6/1998 | Henry et al. | 340/5.54 |
| 5,936,527 A | 8/1999 | Isaacman et al. | |
| 6,127,928 A | 10/2000 | Issacman et al. | |
| 6,204,764 B1 | 3/2001 | Maloney | |
| 6,407,665 B2 | 6/2002 | Maloney | |
| 6,512,459 B2 | 1/2003 | Benezech et al. | |
| 6,677,857 B2 | 1/2004 | Bara et al. | |
| 6,703,935 B1 | 3/2004 | Chung et al. | |
| 6,707,381 B1 | 3/2004 | Maloney | |
| 6,989,749 B2 * | 1/2006 | Mohr | 340/572.1 |
| 7,348,884 B2 | 3/2008 | Higham | |

(Continued)

OTHER PUBLICATIONS

Canadian Office Action, dated Oct. 3, 2008, pp. 1-3, Application No. 2,574,949.

*Primary Examiner*—Tai T Nguyen
(74) *Attorney, Agent, or Firm*—Townsend and Townsend and Crew, LLP

(57) ABSTRACT

An RFID cabinet for monitoring items having an RFID tag includes, a cabinet having at least one locking front door. An RFID detector is used for monitoring each item placed within the cabinet and is located within the interior of the cabinet. A computer is coupled to the RFID cabinet and controls opening and closing of the front door and is configured to receive an input that identifies the user. In this way, the computer is configured to periodically record data read from the RFID tags by the RFID detector.

5 Claims, 3 Drawing Sheets

U.S. PATENT DOCUMENTS

| | | |
|---|---|---|
| 2002/0143320 A1 | 10/2002 | Levin |
| 2002/0145520 A1 | 10/2002 | Maloney |
| 2002/0153411 A1 | 10/2002 | Wan et al. |
| 2002/0190871 A1 | 12/2002 | Stanfield et al. |
| 2003/0030539 A1 | 2/2003 | McGarry et al. |
| 2003/0034390 A1 | 2/2003 | Linton et al. |
| 2003/0052788 A1 | 3/2003 | Chung |
| 2003/0117281 A1 | 6/2003 | Sriharto et al. |
| 2003/0160698 A1 | 8/2003 | Andreasson et al. |
| 2003/0164401 A1 | 9/2003 | Andreasson et al. |
| 2003/0174099 A1 | 9/2003 | Bauer et al. |
| 2004/0032328 A1 | 2/2004 | Rubinstein |
| 2004/0046020 A1 | 3/2004 | Andreasson et al. |
| 2004/0098166 A1 * | 5/2004 | Spano et al. ............. 700/237 |

* cited by examiner

RFID CABINET

CROSS REFERENCE TO RELATED APPLICATIONS

This application is a continuation of U.S. patent application Ser. No. 11/187,383 filed on Jul. 21, 2005, now issued as U.S. Pat. No. 7,348,884, and also claims the benefit U.S. Provisional Application No. 60/592,907, filed Jul. 29, 2004. The entire disclosures of those two applications are hereby incorporated by reference herein.

BACKGROUND OF THE INVENTION

In the healthcare industry, the availability of supply products is critical. Various systems exist that provide tracking of product usage, quick replenishment, user tracking, and patient tracking for billing purposes.

In addition, closed cabinet systems exist that prevent the removal of items without the entry of necessary data to perform the above tracking and prevent diversion or theft. Such a system is particularly applicable to the expensive items that are used in an operating room (OR) or cath lab. However, closed cabinet systems are also applicable to the high volume diversion of inexpensive items that are useful outside the healthcare facility such as batteries, bandages, shampoos, pens etc., where the user may consider the item too small to be considered "theft."

In developing such systems, the challenge lies in balancing convenience and speed of access along with entering the necessary data to identify the user, the product and the account number or patient. Systems that dispense an individual product in the same manner as a candy machine, while desirable for convenience and security, are usually too expensive, require special packaging, and are not flexible in terms of the various size and configurations of product that need to be stocked in a hospital. They are also not very space efficient, since items are individually spaced and housed.

The use of RFID tags on products presents an opportunity to track individual products without the need for expensive dispensing systems. This is particularly true of expensive product where it is worth incurring the additional expense of applying the RFID tags. RFID tags are not currently available on products like bar codes, and are not likely to be generally available on healthcare products for many years.

BRIEF SUMMARY OF THE INVENTION

Figure 1:
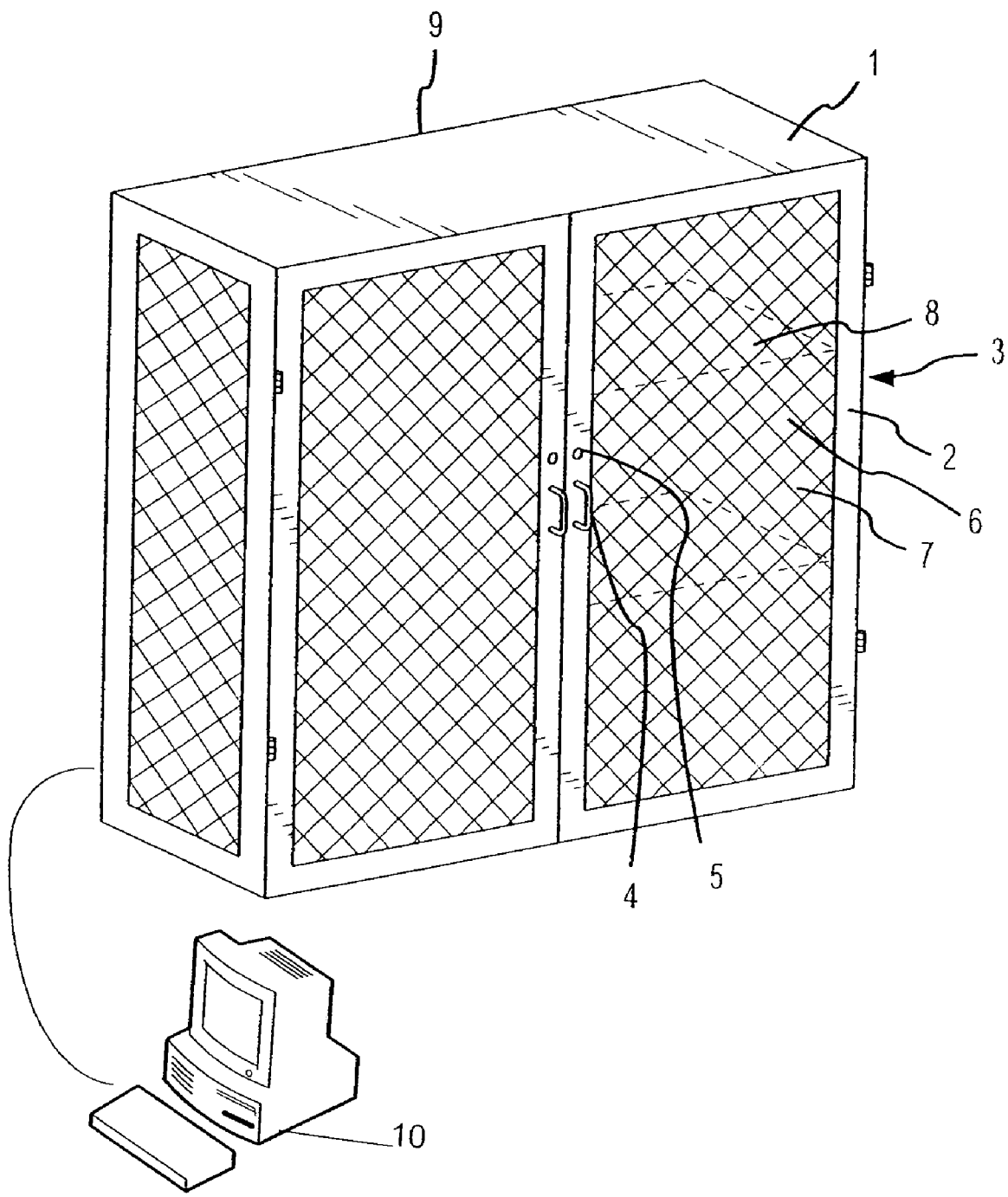
FIG. 1 is a perspective view of one embodiment of the present invention.

The invention provides both methods and apparatus for tracking, monitoring, protecting and safeguarding an inventory of products in a medical environment using RFID tags. In general, a cabinet is provided, the cabinet is constructed of a material sufficient to confine an RFID field generated from an RFID detector within the interior of a cabinet. The RFID detector scans the RFID tags of all products within the cabinet and generates an up-to-the-second inventory list of all products within the cabinet.

One particular aspect of the present invention provides a cabinet for housing an inventory of products in a medical environment. Each product within the cabinet is furnished an RFID tag that is unique to each product. The cabinet contains an RFID detector that generates an RFID field to scan the RFID tags of any product within the interior of the cabinet. A computer is coupled to the cabinet using Ethernet or a similar connection. The computer controls access to the cabinet and also communicates with a database having all the product information associated with each product's RFID tag.

In another aspect of the invention, the locking front door and the side panels of the cabinet are constructed of a transparent material such that the user may see into the cabinet without having to unlock and open the locking front door. The transparent material is manufactured to sufficiently contain the RFID field generated by the RFID detector within the interior of the cabinet. In one embodiment, the transparent material is an acrylic panel that has a coating comprising a number of vertical stripes of a silver based conductive ink and a number of horizontal stripes of a carbon based conductive ink arranged in a checkerboard pattern.

DETAILED DESCRIPTION OF THE INVENTION

Described below are several exemplary embodiments of the invention. Although certain features are described, for ease of discussion, in relation to certain illustrated embodiments, those skilled in the art will appreciate, based on the disclosure herein, that various of the inventive features can be combined in accordance with many different embodiments of the invention. The illustrated embodiments below, therefore, are provided merely by way of example and should not be considered to limit the scope of the invention, which is defined only by the appended claims.

One aspect of the invention provides a cabinet with a locking door, or multiple individually controlled doors. In another aspect, the invention may provide a room (or multiple rooms) with an electronically controlled lock. The cabinet or room may contain multiple quantities of multiple items.

Certain items require specific shelving fixtures because certain items contain a liquid or metal content that prevents the transmission of sufficient signal strength to various tags on the products. Shelving fixtures are designed specifically for those items, or classes of items, to keep them suitably spaced apart. The spacing allows the RFID field to sufficiently energize all the tags in the system.

An RFID detector (or multiple detectors) is placed within the interior of the cabinet. RFID detector provides continuous monitoring of the items within the cabinet, e.g. identifying the data embedded on the tag of each product. The RFID detectors are capable of repeatedly scanning all products in a short time period, preferably less than two seconds. The system determines when an item has been removed by comparing the resulting list of items present with a previously generated item list. Since the scanning time period is preferably short, the invention provides any alerts prior to the user leaving the vicinity of the cabinet and the controlling computer.

The method of the present invention is preferable to existing systems, for example systems that detect an item being moved through a detecting portal area. In existing systems, any detection errors result in cumulative persistent errors that can only be corrected by a manual cycle count. The present invention avoids such errors by repeatedly taking an inventory of all products. In effect, the present invention is a repeated electronic full cycle count.

For multiple readings of RFID tags (and associated inventory) within a cabinet, it is advantageous to change the power distribution during each scan so that different power fields sweep the cabinet. Changing the power distribution provides additional and differentiated coverage, which also boosts the read accuracy.

In accordance with the present invention, the data associated with the RFID tag may take many forms. In one example, the invention uses a fixed ID number that is unique to the universe of tags used for all time. At an appropriate point in time, either at the cabinet or a separate workstation or system in central supply, this unique number is read into a database. Other data regarding the product is also entered into the database for subsequent retrieval. This data may include the item type ID, its UPN, expiration date, serial number, manufacturer or other parameters.

In another example, the RFID tags are WORM (write-once, read many) tags. In the case of a WORM tag, some or all of the data may be written once on the readable memory of the tag and thus can be read directly off the RFID tag. If the central database is unavailable, the product can still be identified. In addition, if access to the central server is unavailable, any user alerts given at the time of removal can be made by the local computer and cabinet system.

In yet another example, the RFID tag utilizes a writable tag. For a writable tag, information may be added to the product by the user. For example, the writable tag may contain information selected by the user such as the ID of the patient, the user ID, the date and time of removal, and the like. In all cases, the data formats associated with the tags should be compatible with the software systems, so that accurate reporting down to the item-level detail can be automated.

Figure 2:
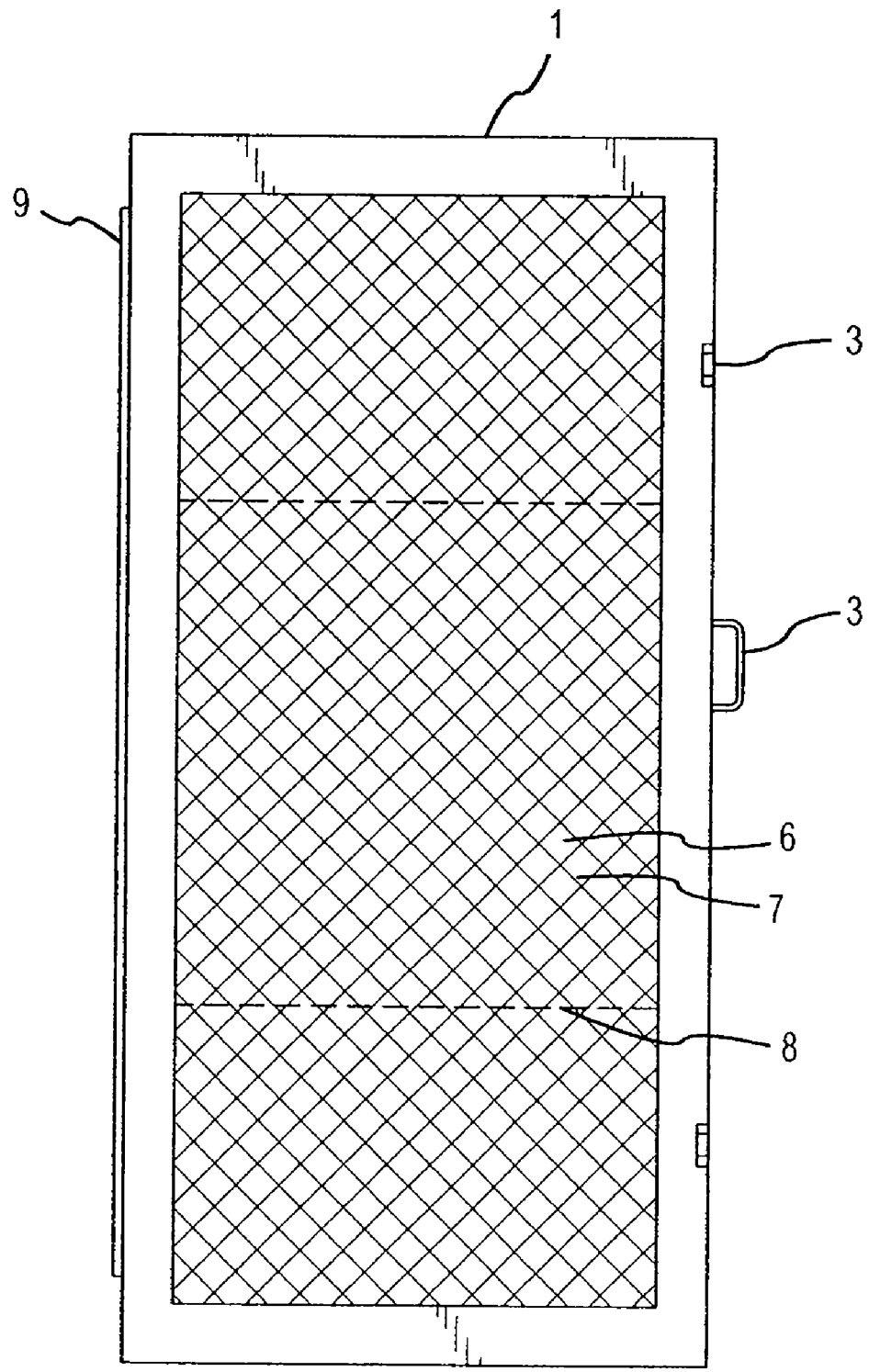
FIG. 2 is a side view of the embodiment of FIG. 1.

FIGS. 1 and 2 illustrate one example of a cabinet in accordance with the present invention. Cabinet 1 comprises a housing frame with locking doors 2, with hinges 3, handles 4 and indicator lights 5. Transparent material 6 in the doors 2 allows the user to see through to the item on the shelves 8, but mesh 7 prevents the radio frequency from the transmitter receiver assembly 9 mounted on the inside rear of the cabinet from propagating outside the cabinet. In another embodiment, the mesh might be replaced by a translucent coating on the glass or plastic transparent material of the door.

Cabinet 1 may be manufactured of any material. However, it is desirable to manufacture cabinet 1 of a metal to contain the RFID field inside the cabinet. Preferably, the types of metals that may be used are steel, although aluminum may also be used. The front door and sides may be transparent to allow the user to see the products inside the cabinet. The front door may include a thermal printer that can provide a paper record of the item taken out from the cabinet. Within the cabinet, it will often be preferable to use non-metal components for shelving and partitions in order to not interfere with the RFID field.

A wire mesh can be used as a shield to contain the RFID field within the cabinet while maintaining the desired level of transparency. The maximum diameter of the holes in the mesh is dictated by the frequency of the RFID field used. In the alternative, a conductive film in the pattern of a mesh may be coated on the transparent surfaces of the doors, either as a thin translucent layer or as an opaque coating. This arrangement provides the necessary containment of the RFID field within the cabinet while allowing the user to see inside the cabinet. More particularly, a regular acrylic panel, and coated a first pass in the vertical orientation with silver based conductive ink in stripes, one-half inch on center, the stripes having a width in the range of 0.05 to 0.25 inches. Then, in the horizontal direction, with carbon based conductive ink in stripes, half inch on center, the stripes having a width in the range of 0.05 to 0.25 inches. Without any specific ground connections, the resulting checkerboard pattern of vertical silver based conductive ink stripes and horizontal carbon based conductive ink stripes contains the RFID field such that the RFID tags associated with items are not read outside the cabinet, while retaining the visibility of the contents of the cabinet.

The use of effective shielding allows for the use of a single powerful energizer and receiving antenna within the cabinet. The use of a single, more powerful energizer and receiving antenna provides reliable detection and a cost effective solution relative to the prior art that use multiple energizers and antennas of shorter range in each shelf or section of a larger cabinet.

A computer controls access to the interior of the cabinet by unlocking and opening the locked front door. Typically, there will be multiple doors, and only the applicable door will be opened according to the level of access associated with the user's ID. This ID may be provided by a variety of means including an RFID badge, a personal identification number, a voice command, a biometric scan, a magnetic card, a barcode badge read or the like depending upon the particular requirements of the cabinet.

It is preferable to use a guiding light to locate the correct cabinet, door and in some cases actual location of the product. By using guiding lights, it is preferable to flash all lights on a cabinet for a few seconds, then on a door or shelves and then down to the item. Such a method is described in U.S. Pat. Nos. 5,745,366, 5,805,455, 5,805,456, 6,039,467, 6,272,394, and 6,385,505 incorporated herein by reference for all purposes.

The computer may be either embedded within the interior of the cabinet or in close proximity to the cabinet, and coupled to the cabinet by Ethernet, wireless, optical infra-red, serial cable, USB or any other data connection means. One advantage of not having the computer embedded within the interior of the cabinet is the use of general-purpose computers with varying form factors. The type, size, shape and/or configuration is unconstrained by the cabinet design. As software rapidly evolves for the cabinet control, newer versions often need a new operating system and these in turn need a new computer. By keeping the computer external, upgrading both software and computer hardware is both easy and inexpensive.

In accordance with another aspect of the present invention, the user accesses the cabinet using a user ID and password, an RFID badge, a bar code, a mag card or various biometrics such as a thumbprint, face recognition or the like. Typically, the particular ID device is located at the user login location or the computer interface. However, in some embodiments, particularly those detecting the RFID badge of a user, the identification of a user occurs at the cabinet. One method of authorization would allow the user to approach the cabinet and have the cabinet recognize the user and unlock the cabinet doors without any action by the user. Such quick recognition presents the ultimate in convenience to busy clinicians where time is a critical factor, such as physicians, and OR nurses requiring items during a case.

The user may or may not be required to select a patient identification or cost center. Instead, accounting for an item may be determined by: 1) the location of the equipment (e.g. the account number for supplies for the OR department in which the equipment is located); 2) identifying the user and associating that user with a department; 3) association to a case by way of the user and the time of day, since the case management system will usually know which users are working on which case; or 4) association to a case and/or patient by use of an identifier such as a mag card or and RFID card. The RFID cards may have a case or patient number encoded on them. Alternatively, these cards may have a permanent ID that is temporarily associated at the beginning of the day with the patient or case for that day.

There may be governmental/regulatory requirements regarding access to certain contents in the cabinets. The user access rules accommodate and authenticate any unique access requirements. For example, the user may be prompted to scan a bar code or otherwise enter information about the product or push a button assigned to a selected item. The user may enter the name(s) or an alias name(s) for a product(s) at the computer. The computer can generate a visual picture of the layout of the cabinet, highlighting where the product(s) is (are) located within the interior of the cabinet. A visual picture is useful, since, for cost reasons, there may be no lights to guide the user to a specific door.

Although the advantage of RFID is that an item removal is recorded with no action from the user, many facilities have cabinets currently in place where the removal of an item is recorded by scanning a barcode, pushing a button, or keying an item ID. There are considerable advantages in combining existing apparatus and methods with the apparatus and methods of the present invention. Existing cabinets are upgraded utilizing aspects of the present invention to accommodate RFID tags. In initial introduction, before a process is fully set up to tag and identify items, a mixed system may be needed. For cost reasons, it may be desirable to stock low cost items that are used in association with high cost items (e.g. gauze pads, tubing, gloves and the like) in the same location. While it may not be worth RFID tagging the low cost items, their use should be recorded to track inventory levels and ensure prompt re-ordering.

Depending on the user's access privileges, one or more of the doors on the cabinet unlock upon successful completion of the entry requirements at the computer user interface. It is desirable to temporarily disable the RFID reader when the door is opened so that an item removed but held near the open door is not mistakenly interpreted by the system as an unremoved item. The user then removes or returns the items from or to the opened compartments.

If the computer is remote, then a sound and/or visual sensor at the cabinet may alert the user to check the monitor of the computer after removing a product. The alert tells the user that the computer has determined that further action is needed in addition to the removal of the product, such as 1) entering of a serial number or other information into the computer; 2) reading of such information using a bar code scanner mounted at the cabinet or at the computer; or 3) alerting the user that an expiration date for the product may have occurred. Preferably, these "sounds" will be recorded speech to clearly instruct the user as to what is needed such as "please scan the serial number and expiration date". In many cases, it is preferable to use text to speech since this allows information specific to the item to be included. For example, "You just removed a Cordis 78 French Catheter. Please check that this is the right item."

A particularly useful text to speech function is to state the quantity on hand. To the degree a system can be in error, the correction of the quantity on hand ensures timely restocking and the availability of product to the caregiver at all times. For example the system might say "You just removed a Medtronic 8F Guiding Catheter. There should be three remaining. If not, please correct the inventory level."

Another useful query is an automated speech to the user asking "Did you get what you needed? If NOT, then, please press 1—If YES, then, no response is necessary." Such a query provides a view into the product usability and customer satisfaction.

Typically, items are placed on the shelves in fixed locations according to the identity of the product using a labeling system. The current quantity on hand for each type of item is tracked by the embedded or local PC, and may be transmitted to a central server. The system generates a restock list any time the quantities of particular items drop below a predetermined par level. Since different items may be restocked from different sources, the system needs to be able to identify different restock lists for those sources.

There may be times when the item removed from the cabinet cannot be returned to the cabinet without additional processing. For example, some regulated items may not be returned to the cabinet by the user without additional authorization and verification. Also, some items may have a limited, out-of-cabinet life and may need some verification that the item was not exposed to adverse environment.

Some authorization and verification may be local, but some may be remote. If local, then it is appropriate to use a "fill-or-kill" method where the next time a restock request is generated comparing par level with actual quantity on hand, no memory of any previous unfulfilled orders is retained. For other products, particularly those ordered outside, it is necessary to track what has been previously ordered, and subtract that from any new comparison of par level minus the current on hand order quantity, but also to net out previous orders that are delivered over time.

When an order is placed with a specific source of material, it is important that the cabinet location receives information regarding what was ordered and order identification number. Therefore, when the restock technician comes to the cabinet after receiving the item for that order, he/she can select the appropriate restock order list by entering (or bar coding or RFID scanning) the number of the restock list. This action allows the computer to register the items that have been brought and the quantities being put away. If this procedure is omitted, the restock technician must select each item in the computer and enter the quantity they are restocking.

The cabinet restock process is easy with the system of the present invention in place. The restock person simply enters their ID and adds the items to the cabinet. In an alternate approach, the user is required to identify a restock list with the associated items. In this case, when he/she adds the items to the cabinet, a shortage list may be produced. A shortage list is useful when relying on an outside fulfillment house to deliver and restock the cabinet, since this will detect diversion of product between the time it was picked in the remote warehouse and when it reached the cabinet. More particularly, since the restock person knows there will be a check, there is less temptation to divert product for one's personal consumption.

With cabinet RFID reading device set up on an Ethernet network, either directly or through a local compute controlling access to the cabinet, the material manager can connect to the reader or cabinet computer database, and get an up to the second inventory of items contained within the cabinet through the Inventory Control Module software. This can be an automated process that enables the RFID Readers to scan items in the remote cabinet and to alert the staff if any items are critically low or out of stock.

If a caregiver needs a particular item that is not stocked in the cabinet in their department, they can use the care giver software to check other RFID enabled cabinets on the network to find the item they needs and how many are actually on hand in that cabinet, all in real time.

With access to the cabinet information derived in real time through the RFID reader, or the computer database supporting the RFID reader, the materials manager can scan the RFID cabinets for items that are past their expiration date or items that are in a lot that has been recalled so they can be collected for return to the manufacturer. It is particularly important to get this information in real time, since items may have been taken then subsequently returned etc, and in previous systems the associated information (lot # serial number) had to be tracked at each step. Using RFID, you essentially have instant inventory review—fresh instantaneous reading of exactly what is in each location, not a deduction of what is in each location as a result of manual recordings of takes, returns, etc., which over time can be incorrect if any step in the recording process is missed.

Figure 3:
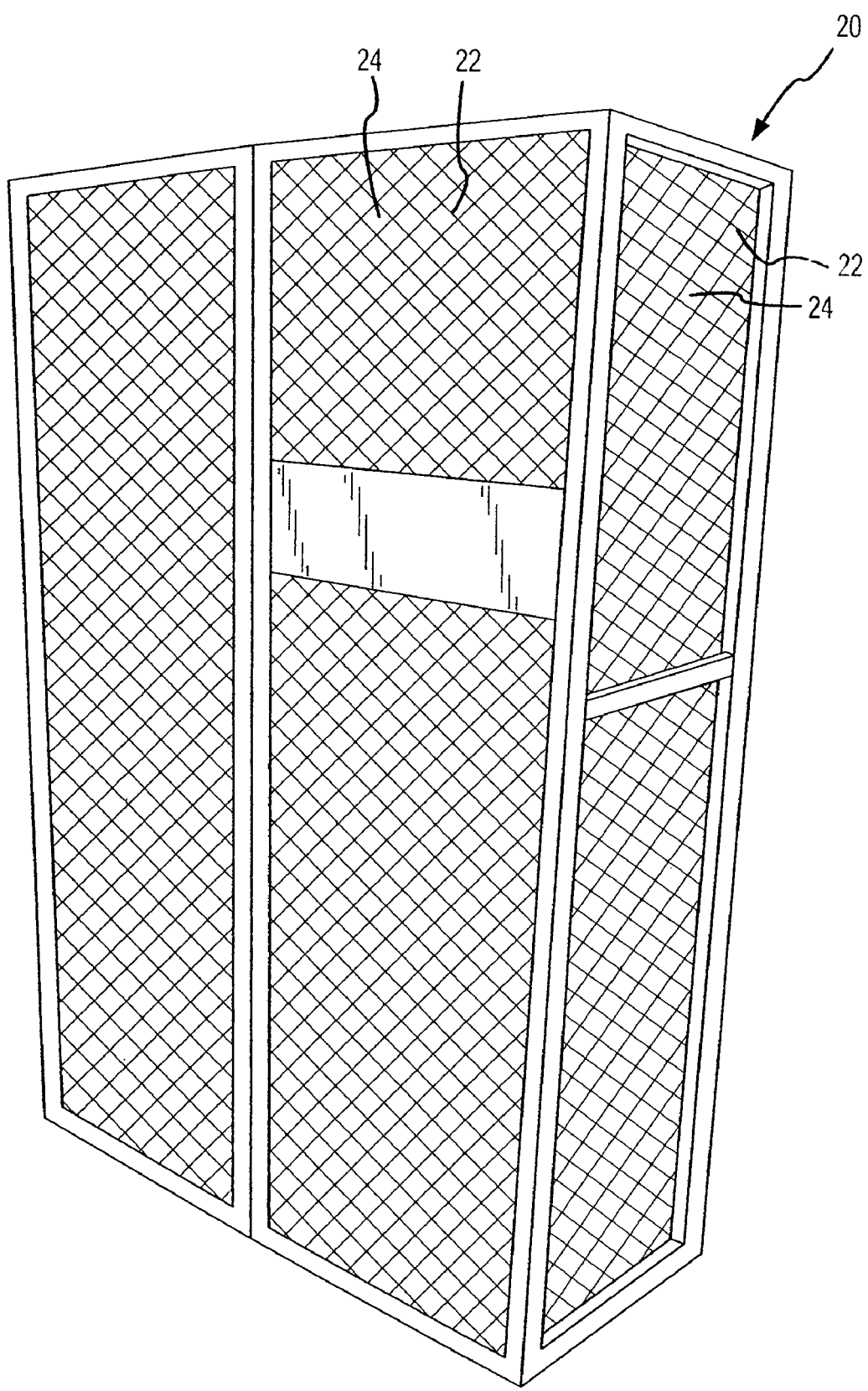
FIG. 3 is a perspective view of another cabinet according to the invention.

FIG. 3 illustrates another cabinet 20 having RF shielding 22 on its outer walls 24 and doors 26. Hence, items 28 that are disposed within cabinet 20 may be scanned while within cabinet 20, with the RF signal being contained within the cabinet.

Cabinet 20 may be configured similar to the other embodiments described herein and they may optionally have locks on the doors and may be divided into multiple compartments for holding multiple items. Further, one or more RFID detectors may be placed within the interior of the cabinet to identify data embedded on the tag of each product. Further, cabinet 20 may include a computer or controller for controlling operation of the RF signals and for processing the data transmitted from the product similar to other embodiments described herein.

The invention has now been described in detail for purposes of clarity and understanding. However, it will be appreciated that certain changes and modifications may be practiced within the scope of the appended claims.

What is claimed is:

1. A storage system, comprising:
   a cabinet for containing a plurality of items of inventory, at least some of the items of inventory comprising RFID tags, each RFID tag comprising data used to identify the item on which it is located;
   an RFID reader contained within the cabinet;
   a computer coupled to the cabinet, the computer configured to periodically 1) cause the RFID reader to read the data from all of the RFID tags in the cabinet and report the data to the computer, and 2) record the data from all of the RFID tags; and
   at least two independently lockable doors comprised by the cabinet, the locking and unlocking of the doors under control of the computer;
   wherein the computer is further configured to receive an input identifying a user of the cabinet, and unlock only an applicable door according to a level of access associated with the user.

2. The storage system of claim 1, wherein the periodic reading and recording of the data from the RFID tags comprises a repeated electronic full cycle count of the items of inventory comprising RFID tags in the cabinet.

3. The storage system of claim 1, wherein at least some items of inventory do not comprise RFID tags, and wherein inventory levels of items without RFID tags are tracked by a method requiring action from the user.

4. A method of scanning items having an RFID tag in an RFID cabinet, the method comprising:
   providing a cabinet having an RFID detector for monitoring each item contained within the cabinet and for identifying data embedded on an RFID tag located on each item contained within the cabinet, the RFID detector located within the interior of the RFID cabinet, the cabinet comprising at least two independently lockable doors;
   providing a computer coupled to the RFID cabinet, wherein the computer controls the locking and unlocking of the doors, and wherein the computer is configured to receive an input that identifies a user of the RFID cabinet, and to open only such doors as the user is allowed access to;
   reading the RFID tag associated with an item using an RFID field from the RFID detector; and
   recording the resulting information in a database located within the memory of the computer.

5. The method of claim 4, further comprising:
   receiving an indication of a particular item within the cabinet; and
   generating on the computer a visual picture of a layout of the cabinet and to highlight in the visual picture where the particular item is located within the cabinet.

* * * * *